Dec. 11, 1928.
M. W. McARDLE
1,694,389
RAZOR STROP
Filed May 13, 1925
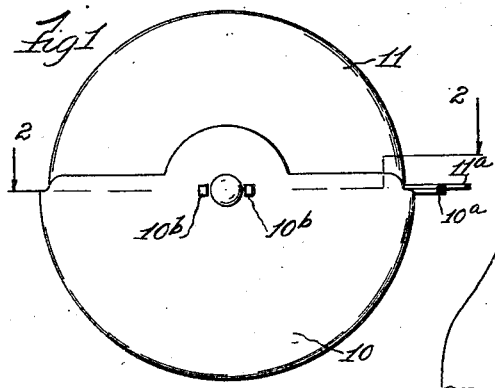
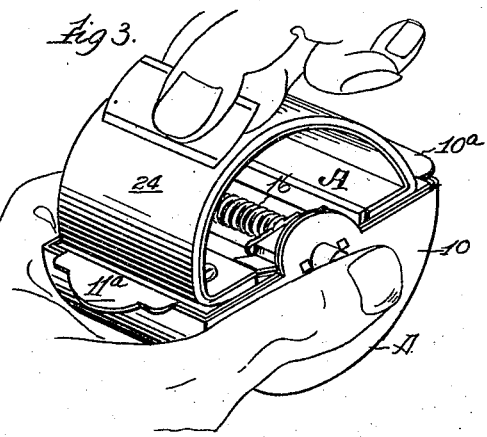
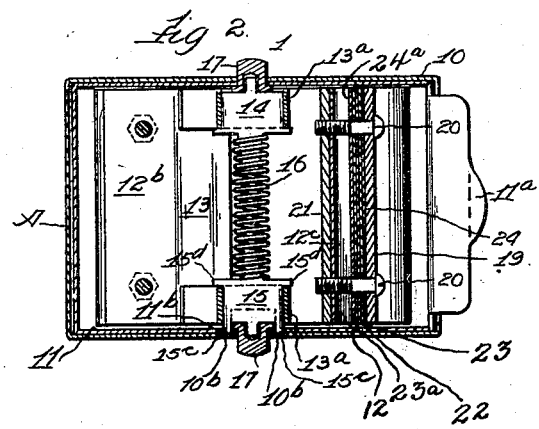
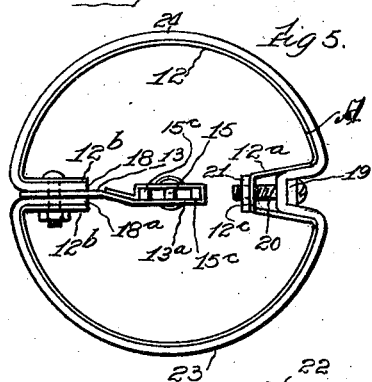
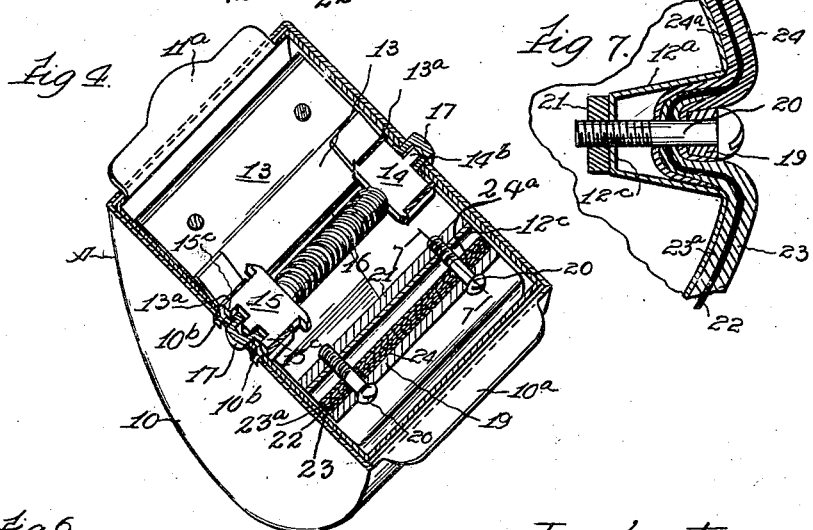
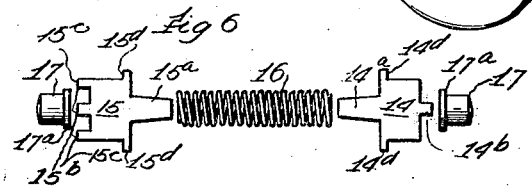
Inventor.
Michael W. McArdle.
by Burton Burton
his Attorneys.

Patented Dec. 11, 1928.

1,694,389

UNITED STATES PATENT OFFICE.

MICHAEL W. McARDLE, OF CHICAGO, ILLINOIS.

RAZOR STROP.

Application filed May 13, 1925. Serial No. 29,879.

The purpose of this invention is to provide an improved device of the nature of a razor stropping instrument, particularly designed and adapted for sharpening safety razor blades and the like. It consists in the elements and features of construction shown and described as indicated in the claims.

In the drawings:

Figure 1 is an end elevation of an implement embodying this invention, the same being shown in closed position out of service.

Figure 2 is a section at the line, 2—2, on Figure 1.

Figure 3 is a perspective view of the device open in position for service, illustrating the manner of handling and manipulation in use.

Figure 4 is a sectional perspective view of the device in open position as shown in Figure 3, section being made axially with respect to the rotatable strop mount.

Figure 5 is an end elevation of the strop mount and strop thereon removed from the case.

Figure 6 is a dissected plan view of the pivot structure by which the rotatable strop is mounted in the case, the same comprising the locking devices for locking the case at closed or open position and the strop mount at operative position.

Figure 7 is a detail section at the line, 7—7, on Figure 4.

The structure shown in the drawings comprises two case members, 10 and 11, each substantially a half cylinder, which are pivoted together as hereinafter explained, and adapted to be rocked relatively about their pivot for telescoping one within the other for which purpose the inner member, 11, is slightly less in both axial and radial dimension than the outer member, 10. The device comprises mounted within the case pivotally about the pivot of the two case members a strop mount indicated as to its entirety by reference letter, A, said mount consisting of a sheet metal strip, 12, folded and coiled into substantially cylindrical form as seen most clearly in Figure 5, the ends meeting for securement together to retain the cylindrical form, each formed with a substantially radially inturned flange, $12^b$, between which the ends of the strop members, 18, $18^a$, are clamped for holding the strop on the mount as hereinafter more particularly explained. This mount, 12, is formed with a substantially radially intruding channel, $12^a$, which in the construction shown is diametrically opposite the meeting flanges, $12^b$, this channel being for the purpose of in-folding into it a loop of the strop member for the purpose of tightening or tensioning the strop on the mount, which is effected by means of a clamping bar, 19, dimensioned for occupying the channel, $12^a$, between the two sides of the loop of the strop member folded into the channel, as seen in Figure 5, the bottom of the channel, $12^c$, and the clamping bar, 19, being provided with registering bolt holes for securing bolts, 20, seen in Figure 4, which are inserted through the in-drawn loop of the strop and tightened by engagement with a nut bar, 21, at the inner side of the channel, all of which may be clearly understood from Figures 4 and 5. The two parts of the strop, 18, $18^a$ are designed to be of different surface character for sharpening and fine-finishing the blade, and I do not limit myself to two divisions of the strop, but it may be made with any desired number. The consecutive parts of the strop have their ends lapped at the loop where the strop is clamped in the channel, $12^a$, as described; and the strop is preferable made reversible, comprising suitable surface layers at opposite sides of a continuous fabric center layer, the ends of both outer layers being lapped as described at the loop where the clamping in the channel, 12, is effected.

To adapt the clamp bar to bind the strop laterally against the channel sides, and also to draw on it for tightening it on the mount by resulting frictional engagement of the edges of the bar with the strop, and thereby relieve the joint at the lapped ends of the strop members from the strain of the stretching which may tend to rupture the joint, it is preferred to make the channel with slightly converging sides, and to correspondingly taper in cross section the clamp bar as seen in Figure 5 for wedging action on the strop members in the process of tightening the same to sink the bar toward the bottom of the channel.

In Figure 7 the construction of the strop as comprising on opposite surfaces operating layers mounted upon a central fabric or strength layer, 22, the layers shown at 23 and 23ª, being respectively the outer and inner sharpening layers and those shown at 24 and 24ª, being respectively the outer and inner finishing layers.

For pivotally connecting the two case members and pivotally mounting the strop mount in the casing, the strop mount comprises a substantially radial inwardly extending plate, 13, which is secured rigidly to the main mount member, 12, by being clamped together with the ends of the strop members between the radially in-turned flange terminals, 12ᵇ, of the mount member, 12. This plate at its inner edge is cut away between the ends leaving the end portions constituting lugs which are folded to form slideways, 13ª, which as to their dimension radially with respect to the mount extend past the axis as seen in Figure 5. In these slideways, respectively, there are mounted and fitted for sliding, axial pintle supports, 14, 15, each having a lug or tongue projecting from the inner end and protruding from the slideway for engaging a coil spring, 16, into whose opposite ends the tongues, 14ª, 15ª, of the pintle carriers, 14, 15, project, as may be understood from the dissected view in Figure 6, and as seen in Figure 4. The spring, 16, is dimensioned for being compressed in assembling of the parts, as seen in Figure 4 so as to react strongly for thrusting the pintle carriers, 14, 15, outward; and the pintle carriers are provided respectively with stop projections, 14ᵈ and 15ᵈ, stopping against the inner ends of the slideways. The outer ends of the pintle carriers are provided with pintle-engaging projections, 14ᵇ and 15ᵇ, and pintles, 17, 17, each having their inner ends flanged at 17ª, for stopping at the inner side of the pivot apertures of the case members, 10 and 11, are axially socketed for engagement with the pintle carrier projections, 14ᵇ and 15ᵇ, as seen most clearly in Figure 2 of the drawings. The case members, 10 and 11, have their heads or end webs at one end provided with apertures, 10ᵇ, at diametrically opposite positions proximate to the pivot axis, said apertures in the two case members being adapted to register with each other both at the closed and at the open position of the case members; and the pintle carrier, 15, at that end of the strop mount has projections, 15ᶜ, 15ᶜ, for engaging the registered apertures of the case members. The pintle, 17, which is engaged with the pintle carrier, 15, is dimensioned axially for protruding normally from the end of the case a distance at least equal to the depth of engagement of the projections, 15ᶜ, with the case apertures, so that the operator pressing upon the projecting end of this pintle may thrust the pintle carrier inward, disengaging its projections, 15ᶜ, from the case apertures, and thereby unlocking the two case members from each other so that they may be relatively rotated, either for opening or closing the case. It will be observed that the same expedient serves for locking the strop mount with respect to the case at the open position of the case, so that said mount is held against rotation while the device is in use for sharpening. It will be observed also that by reason of the case apertures being arranged about the axis angularly separated correspondingly to the number and angular extent of the sub-divisions of the strop mount constituting separate stropping areas, the strop may be locked at the different positions for exposing for service any selected strop area. In the construction shown the number of strop areas being only two, the apertures, 10ᵇ, 10ᵇ, of the case are 180 degrees apart, or as above stated, diametrically opposite; but it will be understood that if the strop mount were provided with a different number of strop areas, a corresponding change would be made in the angular interval between said case apertures.

In respect to the mode of use of this device for sharpening, it involves the invention which is covered in my patent No. 1,580,514, issued April 13, 1926, upon co-pending application, Serial No. 5192, filed January 28, 1925, in that it provides a convex stropping surface over which the blade, 25, held between the thumb and finger of one hand of the operator will be manipulated with a back-and-forth vibrating movement, as indicated in Figure 3, while the device is held firmly by the other hand of the operator grasping the case as shown in that figure.

I claim:—

1. A device for the purpose indicated comprising a casing consisting of two cylindrical segment members pivoted together at their common axis and relatively dimensioned for telescoping one within the other by rocking relatively to each other about said axis, the total of their angular extent being substantially 360°, whereby when rocked relatively to withdraw the lesser from the larger they constitute a substantially closed case; a strop mount within said case mounted for rocking movement about said axis, comprising a cylindrical segment of angular extent suitable for substantially spanning the opening of the case when the case members are telescoped one within the other, and means for locking the strop mount as to its pivotal movement at a position at which its said segment is exposed through the opening of the open case.

2. In the construction defined in claim 1, the means for locking consisting of apertures in the two case members positioned for registering with each other at the open position of said case members, and a catch carried by the strop mount within the casing having projections for engaging said registered apertures at the operative position of the strop mount.

3. In the construction defined in claim 1, the strop mount comprising a plurality of cylindrical segments each adapted for supporting the strop member, the means for locking consisting of apertures in one end of the case members positioned for registering with each other at the open position of the case, and a catch for engaging said apertures carried by the strop mount inside the case, the apertures being in number in each case member equal to the number of strop supporting segments of the mount and arranged about the axis correspondingly as to angular separation to the segments of the mount, whereby the mount is adapted to be locked in the open case with any selected segment exposed through the case opening.

4. In the construction defined in claim 1, the strop mount comprising a metal plate folded to form a plurality of segments with radially inward projecting flanges at the meeting ends of the folded plate; a substantially radial plate clamped between said meeting flanges, and pintles for pivoting the mount in the casing and the two casing members together engaged with the opposite ends of said radial plate.

5. A device for the purpose indicated comprising a casing, a strop mount consisting of a hollow open-ended substantially cylindrical member adapted for seating a strop leather on its cylindrical surface, said member comprising a radially extending plate, said radial plate having an axial slideway; pintle-carrying slides mounting in said slideways; a spring reacting between said slides for thrusting them outwardly, and pintles carried exteriorly at the ends of said slides for engaging the casing.

6. In the construction defined in claim 1, the strop mount consisting of a hollow open-ended substantially cylindrical member having a rigid radially and inwardly extending plate provided with axial slideways, pintle-carrying slides mounted in said slideways and a spring reacting between them for thrusting them outwardly, the case members having apertures positioned for registering with each other at the open position of said case members, one of said slides having a projection for engaging said registered apertures for locking the mount at operative position at the open position of the case.

7. In the construction defined in claim 1, the strop mount consisting of a hollow open-ended substantially cylindrical member comprising a plurality of strop supporting segments and having interiorly a rigid radially extending pintle-carrying plate, the case members having apertures adapted to register with each other at the open position of the case, said pintle-carrying plate having projections carried by said radial plate positioned for engaging said case apertures at the operative position of the mount in the open case.

8. In the construction defined in claim 1, the strop mount consisting of a hollow open-ended substantially cylindrical member comprising a plurality of strop supporting segments and having a rigid inwardly radially extending pintle-carrying plate, a plurality of projections carried by said plate adapted to engage said registering case apertures, said projections corresponding in number and angular distribution about the pintle axis to the number and angular areas apportioned to the several strop supporting segments of the mount, and means for yieldingly holding said projections engaged with said case apertures at the respectively registered positions, whereby the mount is adapted to be locked with respect to the case with any one of its strop supporting segments exposed at the case opening.

9. In the construction defined in claim 1, the case members having registering pintle apertures and other apertures adapted to register with each other at the open position of said members, the strop mount being a hollow open-ended substantially cylindrical member having a rigid inwardly radially positioned pintle-carrying plate, said plate having at its opposite ends slideways for pintle carriers, pintle carriers mounted in said slideways, and a spring reacting between them for thrusting them outward, the pintles having flanges at their inner ends and adapted to be entered from the inside of the case through the pintle apertures of the case members and adapted at their inner ends to be engaged by the outer ends of the pintle carriers, one of said pintle carriers having a projection adapted to engage the second mentioned registered aperture of the case members at the operative position of the mount for exposing its strop supporting segments through the case opening, the pintle at that end being of suitable length to protrude from the case end as far as the length of the engagement of said projection of the pintle carrier with the case members for locking, whereby the same may be disengaged by pushing in said pintle member against the reaction of the spring which reacts between said pintle carriers.

10. In a device for the purpose indicated, a strop mount substantially cylindrical in form having at one location in its circumference means for making fast the opposite ends of a strop member, and having at an opposite location a relatively deep indentation extending across the width of the mount; a one-piece strop member encompassing the mount and having its ends made fast at the first mentioned location with slack for forming a loop adapted to be depressed into the indentation; a rod lodged in the loop and extending across the width of the strop member, and means for forcing and holding the rod down into the indentation to take up the slack of the strop by drawing and holding the loop down in the indentation.

In testimony whereof, I have hereunto set my hand at Chicago, Illinois, this 9th day of May 1925.

MICHAEL W. McARDLE.